United States Patent [19]

Rossing

[11] Patent Number: 5,184,557
[45] Date of Patent: Feb. 9, 1993

[54] EXPANSION JOINT FOR GUIDEWAY FOR MAGNETIC LEVITATION TRANSPORTATION SYSTEM

[75] Inventor: Thomas D. Rossing, DeKalb, Ill.

[73] Assignee: The United States of America as represented by the United States Department of Energy, Washington, D.C.

[21] Appl. No.: 804,555

[22] Filed: Dec. 10, 1991

[51] Int. Cl.$^5$ .............................................. B60L 13/00
[52] U.S. Cl. .................................... 104/286; 104/281
[58] Field of Search ............... 104/286, 294, 281, 282, 104/284, 290, 291, 292, 293; 238/1, 10 R, 2, 151, 10 A, 10 B, 10 C, 10 E, 10 F; 52/795, 796, 798, 591; 403/371, 372, 28, 381

[56] References Cited

U.S. PATENT DOCUMENTS

| | | | |
|---|---|---|---|
| 3,583,123 | 6/1971 | Holmgren | 52/795 |
| 3,588,555 | 6/1971 | Laithwaite | 104/294 |
| 3,736,881 | 6/1973 | Lorinet | 104/290 |
| 3,924,537 | 12/1975 | Matsui et al. | 104/282 |
| 3,937,149 | 2/1976 | Winkle et al. | 104/286 |
| 4,636,667 | 1/1987 | Holzinger et al. | 104/294 |
| 4,696,235 | 9/1987 | Wagner | 104/290 |
| 4,797,263 | 12/1988 | Basic et al. | 104/282 |

FOREIGN PATENT DOCUMENTS

| | | | |
|---|---|---|---|
| 0175877 | 10/1906 | Fed. Rep. of Germany | 52/795 |
| 2434791 | 2/1975 | Fed. Rep. of Germany | 104/294 |
| 2900053 | 7/1980 | Fed. Rep. of Germany | 104/286 |
| 0045010 | 4/1979 | Japan | 104/286 |
| 0031404 | 2/1988 | Japan | 104/281 |

OTHER PUBLICATIONS

Atherton D. L., Joints in Strips for Electrodynamic Magnetic Levitation Systems, IEEE Transactions on Magnetics, vol. Mag-14, No. 2, pp. 69-75 (1978).
Borcherts R. H. Replusion Magnetic Suspension Research U.S. Progress to date, Cryogenics, pp. 385-393 (Jul. 1975).
Coffey et al., The Feasibility of Magnetically Levitating High Speed Ground Vehicles, FRA-RT, pp. 72-39 (Feb. 1972).
Marin et al., Forces on a line current moving above a discontinuous ground plane, Journal of Applied Physics, vol. 45, No. 5 pp. 2055-2057, May (1974).

Primary Examiner—Mark T. Le
Attorney, Agent, or Firm—Tyrone Davis; Thomas G. Anderson; William R. Moser

[57] ABSTRACT

An expansion joint that allows a guideway of a magnetic levitation transportation system to expand and contract while minimizing transients occurring in the magnetic lift and drag forces acting on a magnetic levitation vehicle traveling over the joint includes an upper cut or recess extending downwardly from the upper surface of the guideway and a non-intersecting lower cut or recess that extends upwardly from the lower surface of the guideway. The sidewalls of the cuts can be parallel to each other and the vertical axis of the guideway; the depth of the lower cut can be greater than the depth of the upper cut; and the overall combined lengths of the cuts can be greater than the thickness of the guideway from the upper to lower surface so that the cuts will overlap, but be spaced apart from each other. The distance between the cuts can be determined on the basis of the force transients and the mechanical behavior of the guideway. A second pair of similarly configured upper and lower cuts may be disposed in the guideway; the expansion joint may consist of two upper cuts and one lower cut; or the cuts may have non-parallel, diverging sidewalls so that the cuts have a substantially dove-tail shape.

10 Claims, 2 Drawing Sheets

EXPANSION JOINT FOR GUIDEWAY FOR MAGNETIC LEVITATION TRANSPORTATION SYSTEM

CONTRACTUAL ORIGIN OF THE INVENTION

The United States government has rights in this invention pursuant to contract No. W-31-109-ENG-38 between the United States Department of Energy and The University of Chicago representing Argonne National Laboratory.

BACKGROUND OF THE INVENTION

1. Field of the Invention

The present invention generally relates to a guideway for a magnetic levitation transportation system and more particularly, to a new and improved expansion joint for such a guideway that minimizes transients in magnetic lift and drag forces on a magnetic levitation vehicle as the vehicle travels over the joint.

2. Background of the Invention

A considerable amount of research has been devoted to magnetic levitation transportation systems, particularly for public transportation in countries having densely populated regions. The interest in such magnetic levitation transportation systems are due in part to such factors as energy conservation, high speed travel at ground level, and economic and environmental problems associated with conventional systems. In such a system, a magnetic levitation vehicle is suspended above a guideway by the interaction of superconducting magnets with the guideway such that no physical contact occurs with the rail or roadbed once the vehicle is in motion. The velocity that can be attained by such vehicles is partly dependent on the magnetic lift and drag forces produced by the superconducting magnets interacting with the guideway over which the vehicle is to travel.

Short-circuited conducting loops or a continuous conducting guideway in which large eddy currents are induced by the superconducting magnets mounted on the magnetic levitation vehicle have been proposed for such systems. One advantage of the continuous guideway design is that it avoids the periodic variations in the lift and drag forces that are encountered when loop guideways are used. A continuous track or guideway nevertheless needs to be designed to allow for the difference in the coefficient of thermal expansion of the material from which the guideway is made and the base on which the guideway is supported. For example, an aluminum guideway may be typically mounted on a reinforced concrete base, but the coefficient of thermal expansion of the aluminum will tend to exceed the coefficient of thermal expansion of the concrete. While different aluminum alloys may be used to increase the strength of the guideway and decrease the difference in the coefficient of thermal expansion of the guideway and the base on which it is supported, such alloys tend to have the disadvantage of having a reduced conductivity.

Consequently, discontinuities or expansion joints need to be provided in the guideway to allow for such expansion and contraction. However, the interruption to the flow of induced eddy currents at such discontinuities will cause force perturbations at the joints. For example, truncation of the eddy currents at the discontinuity will cause a loss in the lift forces and the magnetic drag force will vary due to a change in the power dissipation in the guideway resulting from a modification of the eddy currents close to the discontinuity.

A comprehensive study has been made of the effects of different configured guideway joints on these types of forces. The study is reported by Atherton et al. in "Joints in Strips for Electrodynamic Magnetic Levitation Systems", IEEE Transactions on Magnetics, Vol. MAG-14, No. 2, pp. 69-75 (March 1978). The report describes seven different designs for guideway joints that were considered: (1) simple butt joint, (2) angled butt joint, (3) strapped joint, (4) joint with flanged ends, (5) overlap joint, (6) butt joint with a backing strip and (7) butt joint with a covering strip. Actual force measurements on a simple butt joint and a butt joint with a backing strip were reported and in addition, force estimates for all of the joints were reported using an impedance modeling technique. As reported by Atherton et al., those joint configurations all resulted in considerable transients in both the lift and drag forces.

In a report by R. H. Borcherts, "Repulsion Magnetic Suspension Research—U.S. Progress to Date", Cryogenics, pp. 385-393 (Jul. 1985), variations in lift and drag forces caused by joints in guideways for a magnetic levitation transportation system were analyzed using an impedance modeling technique. The same conclusion was reached, namely, the evaluated joints will cause transients in the lift and drag forces so as to effect the ride of a magnetic levitation vehicle traveling over the joints. Other reports of the effects of joints in guideways for magnetic levitation transportation systems include Coffey et al., "The Feasibility of Magnetically Levitating High Speed Ground Vehicles", U.S. DOT Report, FRA-RT. 72-39 (Feb. 1972) and Marin et al., "Forces on a Line Current Moving Above a Discontinuous Ground Plane", Journal of Applied Physics, Vol. 45, No. 5, pp. 2055-2057 (May 1974).

These studies show that undesirable transients will occur with respect to the lift and drag forces as a magnetic levitation vehicle passes over the different configured joints that have been proposed for use in a guideway for a magnetic levitation transportation system. However, these studies do not indicate how those undesirable transients in the lift and drag forces can be reduced in order to provide an improved magnetic levitation transportation system that will among other things provide a smoother ride for passengers in magnetic levitation vehicles used in the system.

SUMMARY OF THE INVENTION

Accordingly, it is an object of the present invention to provide a new and improved guideway for use in a magnetic levitation transportation system.

Another object of the present invention is to provide a new and improved expansion joint for a guideway used in a magnetic levitation transportation system.

A still other object of the present invention is to provide a new and improved continuous guideway for a magnetic levitation transportation system so that the quality of ride for passengers is improved, mechanical vibrations that might lead to material or component failures are reduced and the excitation of motional instabilities is reduced.

Another object of the present invention is to provide a new and in. roved continuous guideway for a magnetic levitation transportation system that enables the guideway to expand and contract to compensate for the difference in the coefficient of thermal expansion of the material from which the guideway is made and the base on which the guideway is supported.

Yet another object of the present invention is to provide a new and improved guideway for a magnetic levitation transportation system having non-intersecting, overlapping cuts or recesses disposed in the upper and lower surfaces of the guideway that provide an improved expansion joint for the guideway while minimizing any transients that might occur in lift and drag forces when a magnetic levitation vehicle travels over the section of the guideway having the expansion joint.

In accordance with these and many other objects of the present invention, a guideway for a magnetic levitation transportation system embodying the present invention includes a continuous guideway over which a high speed magnetic levitation vehicle travels, the magnetic levitation vehicle being suspended or levitated over the guideway by means of superconducting magnets mounted on the vehicle adjacent to the guideway. The guideway may be made of aluminum and mounted on a base made of reinforced concrete. Expansion joints are provided in segments of the guideway so that the guideway is adapted to expand and contract to avoid problems that might occur due to the difference in the coefficient of thermal expansion of the material from which the guideway is made and the base on which the guideway is supported. The expansion joints so provided each includes an upper cut or recess extending downwardly from the upper surface of the guideway and a non-intersecting lower cut or recess that extends upwardly from the lower surface of the guideway. In one embodiment of the present invention, the sidewalls of each of the cuts are parallel to each other and the vertical axis of the guideway; the depth of the lower cut is greater than the depth of the upper cut; and the overall combined lengths of the cuts is greater than the thickness of the guideway from the upper to lower surface so that the cuts will overlap, but be spaced apart from each other. The distance between the cuts can be determined on the basis of the force transients and the mechanical behavior of the guideway.

The cuts provided in the guideway may include a number of alternate configurations. For example, a second pair of similarly configured upper and lower cuts may be disposed in the guideway. On the other hand, the expansion joint may consist of an unequal number of cuts. For instance, two upper cuts and one lower cut may be provided for the expansion joint. In yet another design, the cuts may have non-parallel, diverging sidewalls so that the cuts have a substantially dove-tail shape.

BRIEF DESCRIPTION OF THE DRAWINGS

Many other objects and advantages of the present invention will become apparent from considering the following detailed description of the embodiments of the invention illustrated in the drawings, wherein.

DETAILED DESCRIPTION OF THE PREFERRED EMBODIMENTS

Figure 1:
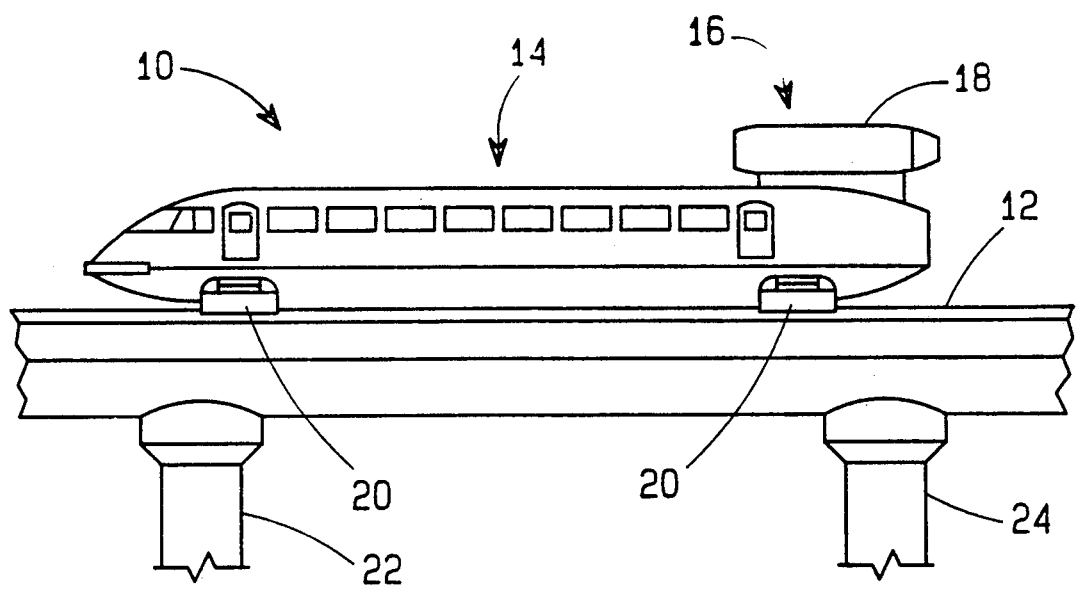
FIG. 1 is a diagrammatic view of a portion of a magnetic levitation transportation system having a magnetic levitation vehicle mounted over a guideway which embodies the present invention.

Referring now more specifically to FIG. 1 of the drawings, therein is a diagrammatic representation of a portion of a magnetic levitation transportation system showing a magnetic levitation vehicle 10 traveling along a guideway which generally is designated by the reference numeral 12 and which embodies the present invention. As illustrated in FIG. 1, the magnetic levitation vehicle 10 may include a passenger section 14 and a propulsion section 16. The propulsion section 16 includes appropriate propulsion devices 18 to propel the magnetic levitation vehicle 10 along the guideway 12. The propulsion section 16 also includes superconducting magnets 20 that interact with the guideway 12 to impart a magnetic lift force on the magnetic levitation vehicle 10 so that it will be suspended or levitated slightly above the guideway 12 as it travels along the guideway 12.

The guideway 12 may be made of aluminum and can be supported above the ground on appropriate concrete pillars, such as the pillars 22 and 24 illustrated in FIG. 1. It is preferable to have a continuous guideway with the sections of the guideway being welded together so that no discontinuities in the guideway exist that might detrimentally affect magnetic lift and drag forces that are acting on the magnetic levitation vehicle 10. However, such a continuous guideway requires some type of expansion joints that are adapted to permit the guideway to expand and contract due to the difference in the coefficient of thermal expansion of the material from which the guideway is made and the base on which the guideway is supported.

For example, the guideway 12 may have a generally rectangular cross section, but other configurations, such as a split rectangular or split L-shaped cross section, may be used for the guideway 12. If the guideway 12 is made of aluminum, it will have a different coefficient of thermal expansion than the concrete supports 22 and 24 on which the guideway 12 is supported. The discontinuities in the guide-way surfaces resulting from previously designed expansion joints cause undesirably high transients in the lift and drag forces acting with respect to the magnetic levitation vehicle as it travels along such previously designed guide-ways. On the other hand, the guideway 12 includes an expansion joint, such as the expansion joint 26, 28, 30 or 32 disclosed in FIGS. 2-6, that minimizes the transients that tend to occur in the lift and drag forces as the magnetic levitation vehicle 10 travels over the expansion joint.

Figure 2:
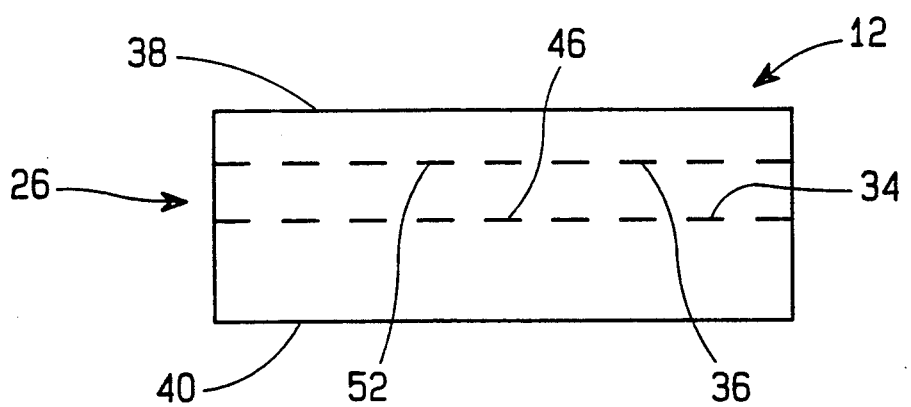
FIG. 2 is an end view of the guideway having an expansion joint which embodies the present invention.
Figure 3:
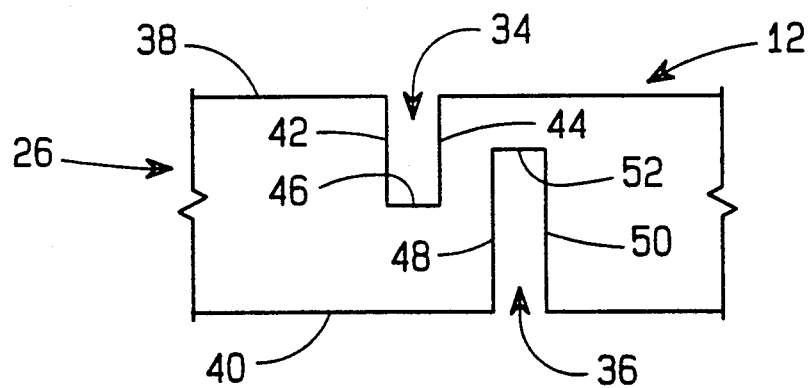
FIG. 3 is a side view of a portion of the guideway illustrated in FIG. 1 having an expansion joint with cuts in the upper and lower surfaces of the guideway.
Figure 4:
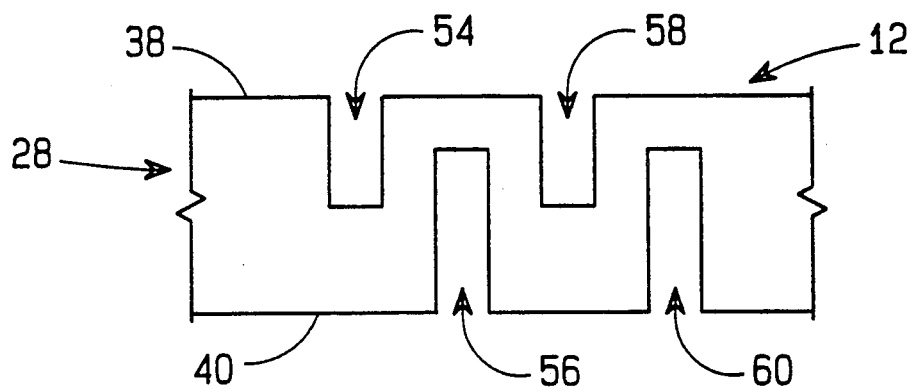
FIG. 4 is a side view of a portion of the guideway illustrated in FIG. 1 disclosing an alternate configuration of cuts in the upper and lower surfaces of the guideway of FIG. 1 so as to provide the guideway with an expansion joint.

More specifically and with particular reference to the expansion joint 26 disclosed in FIGS. 2-3, the expansion joint 26 includes two adjacent, overlapping cuts or recesses 34 and 36. The cut 34 extends transversely through the entire width of the guideway 12 from an upper longitudinally extending surface 38 of the guideway 12 toward a lower longitudinally extending surface 40 of the guideway 12. The cut 34 has a generally rectangular cross section with parallel sidewalls 42 and 44 and an interconnecting bottom wall 46. Similarly, the cut 36 extends transversely through the entire width of the guideway 12 from the lower surface 40 of the guideway 12 toward the upper surface 38 of the guideway 12. The cut 36 also has a generally rectangular cross section with parallel sidewalls 48 and 50 and an interconnecting top wall 52.

As can be seen in FIGS. 2–3, the walls 42 and 44 of the cut 34 are parallel to, but spaced from, the walls 48 and 50 of the cut 36. In addition, the cut 34 does not extend entirely through the guideway 12 to the lower surface 40 nor does the cut 36 extend entirely through the guideway 12 to the upper surface 38. On the other hand, the bottom wall 46 of the cut 34 is disposed below the top wall 52 of the cut 36 so that the cuts 34 and 36 are in a spaced but overlapping relationship.

While the sizes and location of the cuts 34 and 36 will necessarily have to be optimized for each particular guideway 12, the expansion joint 26 shown in FIGS. 2–3 is configured such that the depth of the cut 36 (i.e., the length of the walls 48 and 50) will be greater than the depth of the cut 34 (i.e., the length of the walls 42 and 44). Moreover, the overlapping relationship of the cuts 34 and 36 will be ensured by having the sum of the depths of the cuts 34 and 36 greater than the thickness of the guide-way 12 between the upper surface 38 and the lower surface 40. This type of overlapping should be sufficient to allow the required expansion and contraction of the guideway 12 without excessive bending stresses occurring in the guideway 12. The optimum spacing or distance between the cuts 34 and 36 (i.e., between the walls 44 and 48) Will have to be determined on the basis of the force transients and the mechanical behavior of each particular guideway 12. Nevertheless, the spaced and overlapping relationship between the cuts 34 and 36 that partially extend from opposite surfaces 38 and 40 of the guideway 12 results in transients in the lift and drag forces being minimized as the magnetic levitation vehicle 10 travels over the expansion joints 26.

In certain guideways 12, it is desirable to provide an expansion joint that will distribute the expansion over a greater length or amount of the guideway 12. In such a case, the expansion joint 28 disclosed in FIG. 4 can be used. The expansion joint 28 has four cuts or recesses 54, 56, 58 and 60. The cuts 54 and 58 are identical to the cut 34 and the cuts 56 and 60 are identical to the cut 36. In addition, the relationship of the cuts 54 and 56 and the cuts 58 and 60 are the same as the relationship between the above-described cuts 34 and 36. Even though the expansion joint 28 includes an additional pair of cuts, the transients in the magnetic lift and drag forces that occur when the magnetic levitation vehicle 10 passes over the expansion joint 28 still are minimized.

Figure 5:
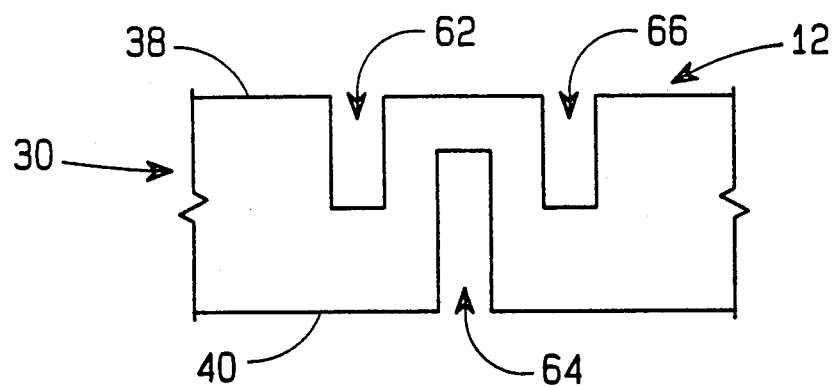
FIG. 5 is a side view of a portion of the guideway illustrated in FIG. 1 disclosing another alternate configuration of cuts in the upper and lower surfaces of the guideway of FIG. 1 so as to provide the guideway with an expansion joint.

Another expansion joint 30 is disclosed in FIG. 5. The expansion joint 30 includes three cuts or recesses 62, 64 and 66. The cuts 62 and 66 are identical to the cut 34 and the cut 64 is identical to the cut 36. As was the case with respect to the expansion joint 28, the relationship of the upper cut 62 to the lower cut 64 and the upper cut 66 to the lower cut 64 are the same as the relationship between the above-described cuts 34 and 36. Again, the expansion joint 30 tends to distribute the expansion of the guideway 12 over a longer longitudinal portion of the guideway 12 but tends to minimize any transients in the magnetic lift and drag forces as the magnetic levitation vehicle 10 travels over the expansion joint 30.

Figure 6:
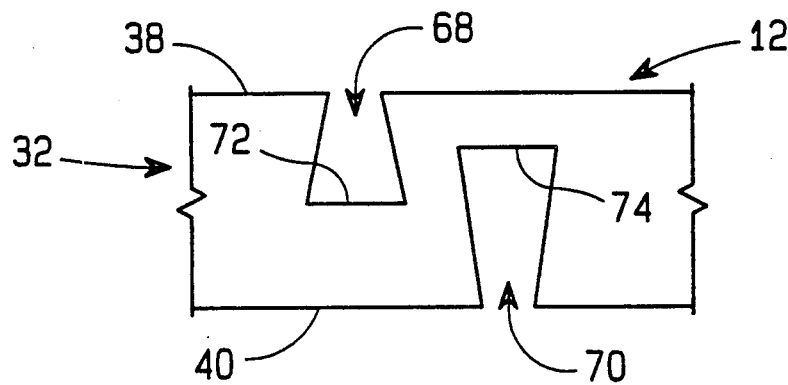
FIG. 6 is a side view of a portion of the guideway illustrated in FIG. 1 disclosing another alternate configuration of cuts in the upper and lower surfaces of the guideway of FIG. 1 so as to provide the guideway with an expansion joint.

In FIG. 6, the expansion joint 32 is disclosed. The expansion joint 32 is similar to the expansion joint 26 but the shape of cuts 68 and 70 are somewhat different in cross section shape. More specifically, the upper cut 68 and the lower cut 70 each have diverging sidewalls so that the cuts 68 and 70 have a dove-tail cross-sectional shape. However, like the cuts 34 and 36 in the expansion joint 26, the cut 68 extends from the upper surface 38 of the guideway 12 to a bottom wall 72 and the lower cut 70 extends from the lower surface 40 of the guideway 12 to a top wall 74. The bottom wall 72 of the cut 68 is disposed below the top wall 74 of the cut 70 so that the cuts 68 and 70 are likewise in a spaced, but overlapping relationship similar to the cuts 34 and 36 in the expansion joint 26.

While the invention has been described with reference to details of the illustrated embodiments, these details are not intended to limit the scope of the invention as defined in the appended claims.

I claim:

1. An expansion joint for a longitudinal guideway having a first longitudinal surface and an opposed second longitudinal surface, said expansion joint comprising:
   at least a first cut extending from said first surface partially towards said second surface, said first cut having a first depth;
   at least a second cut extending from said second surface partially towards said first surface, said second cut having a second depth greater than said first depth and being spaced from said first cut;
   wherein the sum of said first and second depths is greater than the distance between said first and second surfaces of said guideway.

2. The expansion joint as set forth in claim 1 wherein said first cut has generally parallel first sidewalls and said second cut has generally parallel second sidewalls.

3. The expansion joint as set forth in claim 1 including a third cut extending from said first surface partially towards said second surface, said first cut being disposed on one longitudinal side of said second cut and said third cut being disposed on an opposite longitudinal side of said second cut.

4. The expansion joint as set forth in claim 3 including a fourth cut extending from said second surface partially towards said first surface, said fourth cut being disposed on a longitudinal side of said third cut opposite the longitudinal side on which said second cut is disposed.

5. The expansion joint as set forth in claim 1 wherein said first cut has generally diverging first sidewalls such that said first cut has a generally dove-tail cross section and said second cut has generally diverging second sidewalls such that said second cut has a generally dove-tail cross section.

6. A expansion joint for a guideway for a magnetic levitation transportation system in which said guideway has an upper surface over which a magnetic levitation vehicle travels and an opposed lower surface, said expansion joint comprising:
   at least a first recess extending from said upper surface partially towards said lower surface, and having a first depth;

at least a first recess extending from said upper surface partially towards said lower surface, and having a first depth;

at least a second recess extending from said lower surface partially towards said upper surface having a second depth greater than said first depth and said second recess being spaced from said first recess; and wherein the sum of said first and second depths is greater than the distance between said upper and lower surfaces of said guideway such that said first and second recesses are in overlapping relationship to each other.

7. The expansion joint as set forth in claim 6 wherein said first recess has generally parallel first sidewalls and said second recess has generally parallel second sidewalls.

8. The expansion joint as set forth in claim 6 including a third recess extending from said upper surface partially towards said lower surface, said first recess being disposed on one longitudinal side of said second recess and said third recess being disposed on an opposite longitudinal side of said second recess.

9. The expansion joint as set forth in claim 8 including a fourth recess extending from said lower surface partially towards said upper surface, said fourth recess being disposed on a longitudinal side of said third recess opposite the longitudinal side on which said second recess is disposed.

10. The expansion joint as set forth in claim 6 wherein said first recess has generally diverging first sidewalls such that said first recess has a generally dove-tail cross section and said second recess has generally diverging second sidewalls such that said second recess has a generally dove-tail cross section.

* * * * *